United States Patent [19]

Peltola

[11] Patent Number: 5,685,891

[45] Date of Patent: Nov. 11, 1997

[54] COMPOSTING METHODS

[75] Inventor: Rainer Peltola, Helsinki, Finland

[73] Assignee: Helsinki University Licensing, Ltd., Helsinki, Finland

[21] Appl. No.: 558,230

[22] Filed: Nov. 17, 1995

[51] Int. Cl.[6] .................. C05F 9/04; B09B 3/00
[52] U.S. Cl. .................. 71/9; 71/6; 71/903; 435/262; 435/262.5
[58] Field of Search .................. 71/6, 8, 9, 900, 71/904, 903; 435/262, 262.5

[56] References Cited

U.S. PATENT DOCUMENTS

| | | | |
|---|---|---|---|
| 5,127,187 | 7/1992 | Hattori et al. | 47/59 |
| 5,275,733 | 1/1994 | Burnham | 210/609 |
| 5,312,474 | 5/1994 | Iijima | 7/6 |
| 5,336,290 | 8/1994 | Jermstad | 71/13 |

FOREIGN PATENT DOCUMENTS

| | | |
|---|---|---|
| 0 566 256 | 10/1993 | European Pat. Off. . |
| 40 31 862 | 4/1992 | Germany . |
| 42 03 830 | 8/1993 | Germany . |
| WO 94/10095 | 5/1994 | WIPO . |
| WO 95/08513 | 3/1995 | WIPO . |

OTHER PUBLICATIONS

Lysak L.V. et al., "Oil Destruction by Momocultures and Natural Associates of Soil Bacteria," (see abstract) BIOSIS nA 94:490271.

Primary Examiner—Ferris Lander
Attorney, Agent, or Firm—Marshall, O'Toole, Gerstein, Murray & Borun

[57] ABSTRACT

Methods for improving the bioremediation of soil and other organic material that has been contaminated by hydrocarbon waste are disclosed.

10 Claims, 4 Drawing Sheets

COMPOSTING METHODS

FIELD OF THE INVENTION

The present invention provides methods for improving the bioremediation of contaminated soil and for increasing the efficiency of composting methods.

BACKGROUND OF THE INVENTION

Contaminated soil poses a serious public health threat. This is especially true in urban areas or in areas in which groundwater provides a source of drinking water. In most cases, the contaminated area is an old gas station or fuel storage area in which contaminated soil exists in the vicinity of underground fuel tanks. The contamination in such cases is usually a hydrocarbon, such as a fuel or oil.

Composting is often used to treat hazardous waste, such as fuels or other hydrocarbons, that have contaminated the soil. Composting involves the production of biomass, inorganic by-products, and energy by microorganisms that degrade organic matter aerobically. In bioremediation, composting often involves the windrow system, which is an open system in which the compost pile is formed into several rows and aeration is achieved by mechanically turning the piles. Alternatively, in the so-called Beltsville and in-vessel systems, aeration is achieved by air distribution systems usually located under the compost pile.

Composting methods according to the art often use bulking agents, such as wood chips or bark, in order to improve aeration. Methods of the art also report mixing a feedstock of biodegradable material with the compost pile in order to facilitate co-metabolism of the waste material during the composting process.

Composting methods of the art often raise environmental concerns, especially when they are used in the bioremediation of soil contaminated with hazardous waste, such as hydrocarbons. Prior art methods often result in an actual increase in contamination due to the presence of bulking agents in the windrows, an increase in airborne contamination due to the presence of volatile chemicals in the waste material, and the inability to contain the hazardous material during composting.

Bioremediation of hazardous waste has been reported. However, reported techniques utilize organisms, such as the fungi, Phanerochaete, which have been shown to degrade numerous toxic substances. Aerobic bacteria have also been used as degraders. However, the art has not reported the use of nonmicrobial adsorbents in composting methods to treat contaminated soil which are capable of adsorbing both the hydrocarbon contaminants and the microorganisms responsible for organic metabolism.

Accordingly, there is a need in the art for a safe nonmicrobial means for neutralizing soil-embedded hydrocarbon contaminants and metabolic microorganisms that does not result in evaporation of the contaminants as a result of the process.

SUMMARY OF THE INVENTION

Methods are presented in which a nonmicrobial adsorbent is added to a compost pile in order to facilitate bioremediation of hazardous waste material. Methods according to the invention are especially useful for the treatment of soil or organic matter that has been contaminated by hydrocarbons such as fuels or oils. Methods according to the invention may also comprise the step of introducing to a compost pile both a nonmicrobial adsorbent and a microorganism capable of biodegradation.

In a preferred embodiment, methods of the invention comprise the step of introducing a non-biohazardous hydrophobic adsorbent to the compost pile. Particularly preferred methods of the invention comprise the step of introducing an activated carbon compound to the compost pile. Also in a preferred embodiment, the activated carbon is coconut carbon. The introducing step in methods according to the invention may also comprise introducing a hydrophobic biopolymer, such as poly-β-hydroxybutyric acid, or a hydrophobic plastic, such as porous polystyrene foam, to the compost pile. Porous polystyrene foam or plastic according to the invention must have substantial interstices or be finely granulated in order to bind both the degrader microorganism and the biohazardous substance. Methods according to the invention may also comprise the step of introducing a composite granule, such as a composite having an inorganic core coated with an hydrophobic adsorbent, to the compost pile.

Methods according to the invention may comprise introducing an adsorbent and further adding a microorganism capable of degrading hydrocarbons to the compost pile. A microorganism for use in methods according to the invention may be any microorganism capable of degrading hydrocarbons and may preferably be a member of the Actinomycetes group of bacteria. A highly-preferred bacterium for use in methods according to the invention is *Rhodococcus opacus*, specifically, *Rhodococcus opacus* GM-14.

Additional aspects and advantages of the invention will be apparent to the skilled artisan upon reading the following detailed description thereof.

DETAILED DESCRIPTION OF THE OF THE INVENTION

Figure 1:
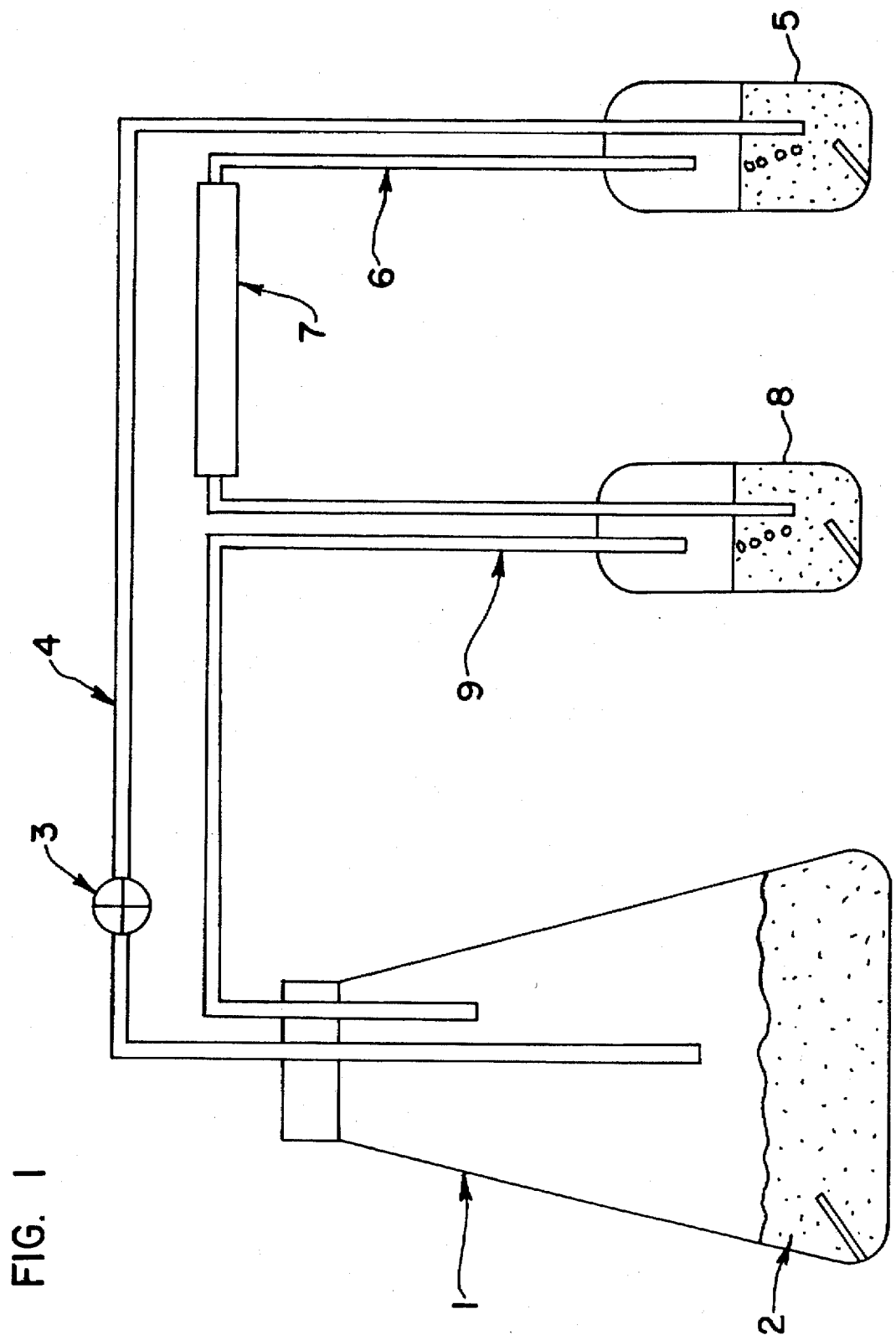
FIG. 1 is a schematic diagram of a bioreactor used to test methods according to the invention.

The present invention provides numerous improvements in methods for composting soil that has been contaminated by hydrocarbons. For example, application of an adsorbent to the compost pile will allow the aeration of soil contaminated by, for example, gasoline without loss of hydrocarbons by evaporation. As the evaporation of hydrocarbons decreases, worker safety is improved. The invention is based upon the observation that both the cell surface of microorganisms that degrade hydrocarbons and the hydrocarbons themselves are often hydrophobic. Thus, the invention provides materials that simultaneously adsorb both degrader microorganisms and fuel from soil.

Numerous adsorbents may be used in methods of the invention. The adsorbent should be hydrophobic and non-biohazardous. As used herein, "hydrophobic material" is one that maintains an octanol-water partition coefficient greater than 1.0.

A highly-preferred adsorbent for use in methods according to the invention is activated carbon. Coconut carbon is an especially-preferred form of activated carbon due to its high degree of hydrophobicity and its low cost. Coconut carbon is derived from coconut husk in an incomplete combustion reaction and is commercially available, for example, from VesTek Oy (Helsinki, Finland).

Degrader microorganisms of the invention may be any non-biohazardous microorganism capable of degrading hydrocarbon-based material. Hydrophobic bacteria, such as *Rhodococcus opacus* GM-14 or other Actinomycetes, are especially preferred. Examples of such bacteria are presented in "Microbial Cell Surface Hydrophobicity" (Doyle, et al., eds., 1990), incorporated by reference herein. If it is determined that a degrader microorganism is or may be present in the material to be composted, it is, of course, not necessary to add a degrader microorganism to the compost pile. In that case, the adsorbent will attach both the biohazardous material and the indigenous microorganisms.

Upon completion of the composting process, it may be desirable to extract the adsorbent. However, extraction is not necessary, as methods of the invention may be used to decrease the volatility of biohazardous waste; thus eliminating the potential biohazard during composting. Accordingly, further processing is only necessary if the soil is to be used subsequently in a manner requiring further processing.

As the invention is based upon the principle that a hydrophobic adsorbent adsorbs waste and microorganisms by mutual attractive forces, numerous adsorbents for use in presently-claimed methods are apparent to the skilled artisan upon reading the present description. The use of a particular adsorbent is exemplified below.

EXAMPLE

The present invention was tested using soil contaminated with benzene. Soil spiked with radiolabeled benzene (300 mg benzene/kg of soil) was composted in a closed container. The amount of evaporated benzene was measured during composting. Labeled carbon dioxide generated during biodegradation was also measured as an indication of the organic metabolic rate of the compost pile. The results, shown in FIG. 2, were that soil treated with the adsorbent (in this example coconut carbon) decreased the evaporation of benzene 95% compared to a control composting in which the soil was not treated with an adsorbent.

A schematic diagram of the bioreactor system used to test the present invention is shown in FIG. 1. The bioreactor system comprised a flask 1 containing contaminated soil 2, an air pump 3 that pumped air through a first conduit 4 from the flask 1 to a first vessel 5 containing a 3M aqueous NaOH solution, a second conduit 6 having an activated charcoal trap 7 and being connected to the first vessel 5 and a second vessel 8 which contained water, and a third conduit 9 which brought recycled air back to the flask 1 from the second vessel 8. Airflow through the reactor was recycled at a rate of 2 ml/minute. The $^{14}CO_2$ produced by mineralization of labeled benzene was trapped in aqueous sodium hydroxide in the first vessel 5 and any labeled benzene that evaporated was captured in the activated carbon trap 7. Peroxides that sometimes formed in the aqueous sodium hydroxide were removed by passing the recycled air through water (in the second vessel 8) before recycling the air into the flask 1. Labeled $CO_2$ that remained in the sodium hydroxide solution was measured in a Wallac 1411 liquid scintillation counter. Activated charcoal in the trap 7 (containing evaporated labeled benzene) was burned in a Junitek oxidizer (Junitek, Helsinki FI). In that device, activated carbon was heated to about 1000° C., forming $CO_2$ which was captured by a LumaSorb II amine derivative trap (Lumac). A liquid scintillation counter was then used to determine the $^{14}CO_2$ that evolved from the carbon burn, thus providing an estimate of the benzene that evaporated from the first vessel 5.

Prior to conducting soil incubation tests, the efficiency of detection of the trapping systems was determined and the results are shown below in Table 1. The abbreviation "dpm," as set forth in Table 1, denotes "disintegrations per minute."

TABLE 1

| Concentration of label in reactor flask | Label in NaOH trap | Label in Carbon trap |
|---|---|---|
| 50,000 dpm $^{14}C$ benzene | <60 dpm | 49,500 dpm |
| 50,000 dpm $^{14}CO_2$ | 49,700 dpm | <60 dpm |
| Both 50,000 dpm $^{14}C$ benzene and 50,000 dpm $^{14}CO_2$ | 45,100 dpm | 44,300 dpm |

As shown in Table 1, the trapping systems were able to account for almost all labeled benzene originally placed in the flasks.

Soil incubation tests using the above-described bioreactor system were carried out as follows in four different reaction schemes. Benzene-contaminated soil was placed in each of four flasks. The first flask contained inorganic nutrients in the form of a commercial fertilizer (Kekkila 6-superex, 124 mg in 1 kg soil). The second flask contained the Kekkila fertilizer and the bacterium *Rhodococcus opacus* GM-14, at a concentration of $10^7$ cells in 1 gram of soil. The third flask contained the Kekkila fertilizer and activated carbon (coconut carbon). The fourth flask contained the Kekkila fertilizer, activated carbon (coconut carbon), and *Rhodococcus opacus* GM-14. The concentration of the adsorbent is determined on the basis of the type of hydrocarbon waste material to be neutralized and the desired speed of neutralization. The person of ordinary skill in the art is able to determine an amount of adsorbent to be used in each case. Any amount of adsorbent will have some effect, thus the precise amount is determined by parameters (determine speed, volatility of hydrocarbon waste) that apply in each coincidence in which the invention is practiced.

The initial concentration of $^{14}$-labeled benzene in the soil samples was 300 mg/kg (75,000 dpm per reactor). Radioactivity in the carbon traps was determined after either 3 or 54 days and radioactivity in the sodium hydroxide solution was measured weekly.

Figure 2:
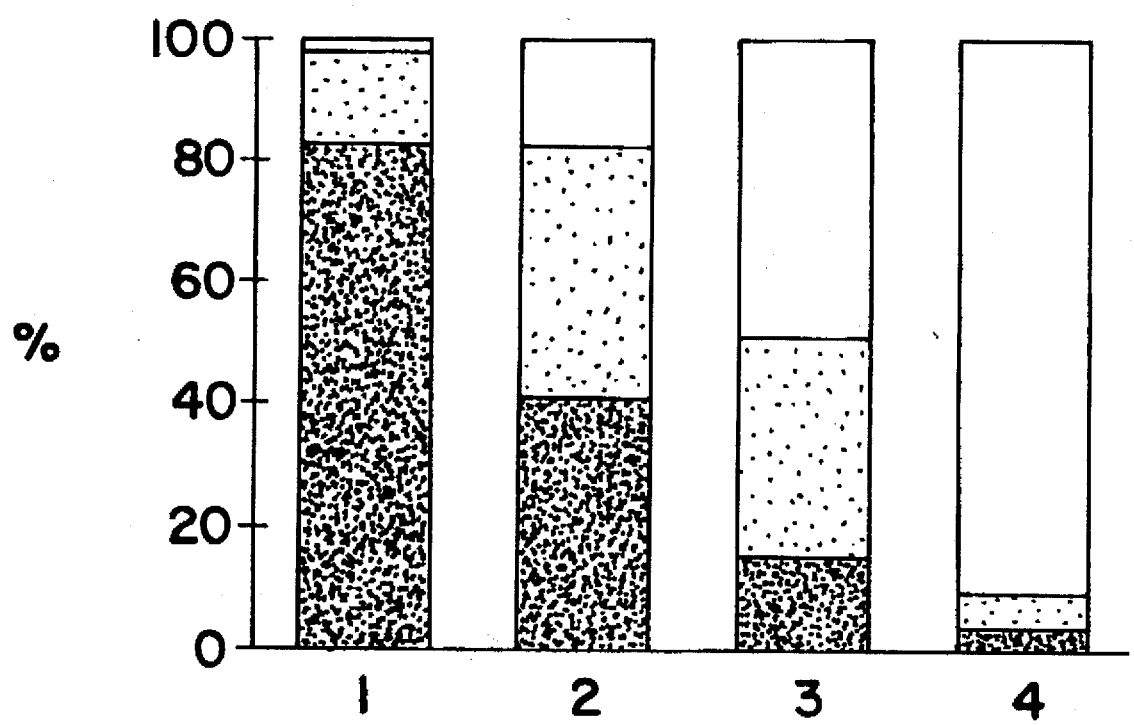
FIG. 2 is a graph showing the capture of a biohazardous material using methods of the invention as compared to control methods.

As shown in FIG. 2, the introduction of an adsorbent into composted soft decreased benzene evaporation while simultaneously increasing the biodegraded fraction of the hydrocarbon. The explanation for this is that the cell surface of indigenous degrader bacteria is hydrophobic and is, therefore, adsorbed along with hydrocarbon by the adsorbent. In FIG. 2, the first set of columns (1) show results in untreated soil, the second set of columns (2) show results when only the degrader microorganism was added to the soil, the third set of columns (3) show results when only an adsorbent was added, and the fourth set of columns (4) show results when both the degrader microorganism and the adsorbent were added to the soil. In each case, the dark portion of the columns represents the percent of evaporated benzene, the stippled portion of the columns represents the amount of $CO_2$ evolved in the biodegradation of benzene, and the clear potion of the columns represents benzene remaining in the soil. As shown in the fourth set of columns (marked 4) in FIG. 2, nearly all the benzene originally placed in the soil remained in the soil (i.e., was not volatized) when both degrader microorganisms and an adsorbent were present. As shown in the third set of columns (marked 3) in FIG. 2, adding only an adsorbent to the soil reduces the volatility of benzene by about 50%; whereas adding only the degrader microorganism (second set of columns) only reduced benzene volatility by about 20%.

Figure 3:
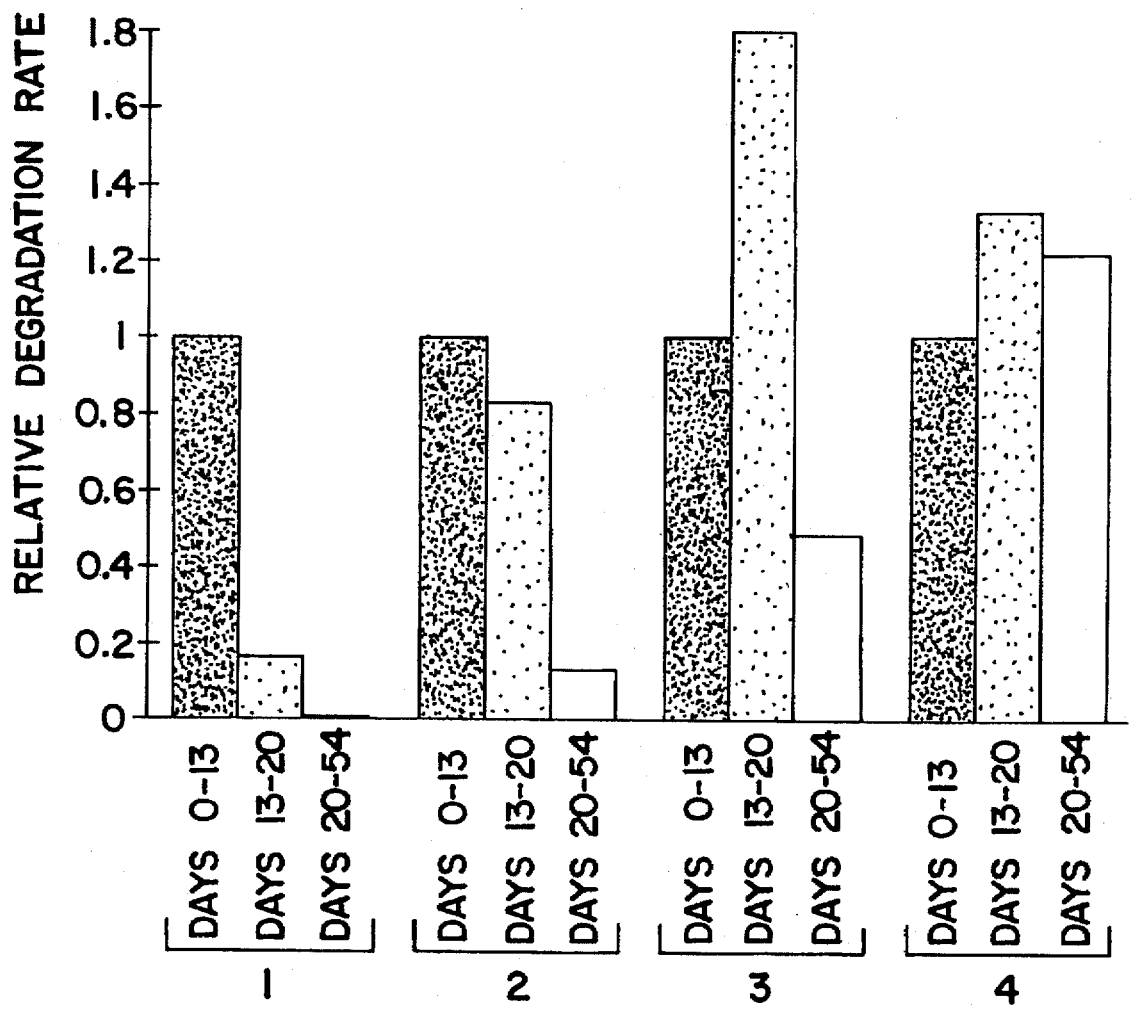
FIG. 3 is a graph showing the stability of capture of biohazardous material in methods according to the invention as compared to control methods.

The degradation rate in soft to which adsorbent was added was also more stable than the degradation rate of benzene (measured as evolved $CO_2$) in soft to which no adsorbent was added. FIG. 3 shows the dramatic decrease in degradation rate during the composting of soil to which no adsorbent was added as compared to the relatively stable degradation rate in soft to which both degrader microorganism and adsorbent were added. The reason for the observed decrease in degradation rate is the increased evaporation of benzene from soil when no adsorbent was present. In FIG. 3, the first set of histograms represents results obtained using untreated soil, the second set of histograms represents results obtained in soil treated only with the degrader microorganism, the third set of histograms represents results obtained when soil was treated with only an adsorbent, and the fourth set of histograms represents results obtained when soil was treated with both the degrader microorganism and the adsorbent.

Figure 4:
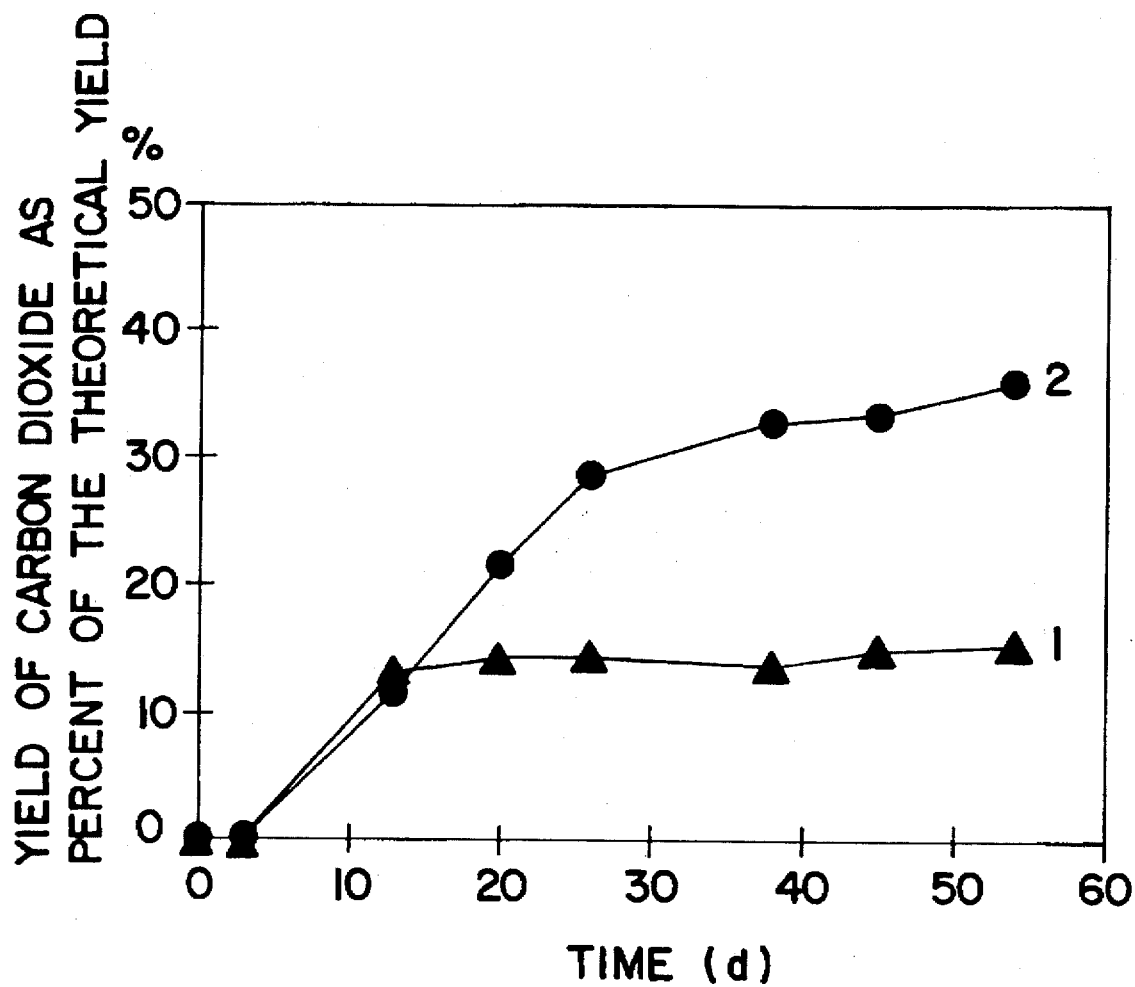
FIG. 4 is a graph showing carbon dioxide yield in methods according to the invention as compared to control methods.

Finally, as shown in FIG. 4, biodegradation no longer occurred after day 13 in soil samples which were not treated with an adsorbent (line 1 in the graph). However, when adsorbent was added to the soil, degradation continued for at least 54 days (line 2 in the graph).

As shown by the foregoing, methods of the invention are useful in reducing or eliminating hazardous materials during composting and are also useful for increasing the efficiency of the composting process. The invention has been described in terms of its preferred embodiments. Numerous additional aspects of the invention and improvements thereon are apparent to the skilled artisan based upon the present disclosure.

I claim:

1. A method for reducing the volatility of hydrocarbon waste from a compost pile, comprising the steps of:

a. providing a compost pile comprising hydrocarbon waste;

b. introducing a nonmicrobial hydrocarbon adsorbent to said compost pile; and c. adsorbing said hydrocarbon waste with said adsorbent.

2. The method according to claim 1, wherein said adsorbent comprises an activated carbon compound.

3. The method according to claim 2, wherein said activated carbon compound comprises coconut carbon.

4. The method according to claim 1, wherein said adsorbent is selected from the group consisting of porous hydrophobic plastics and hydrophobic biopolymers.

5. The method according to claim 4, wherein said adsorbent comprises porous polystyrene foam.

6. The method according to claim 4, wherein said adsorbent comprises poly-$\beta$-hydroxybutyric acid.

7. The method according to claim 1, further comprising the step of adding a microorganism capable of degrading hydrocarbons.

8. The method according to claim 7, wherein said microorganism comprises a member of Actinomycetes.

9. The method according to claim 8, wherein said microorganism comprises *Rhodococcus opacus*.

10. The method according to claim 1, wherein said adsorbent comprises a composite granule comprising an inorganic core coated with a hydrophobic adsorbent.

* * * * *